United States Patent Office 3,082,526
Patented Mar. 26, 1963

3,082,526
METHOD AND MATERIALS FOR FILLING DENTAL ROOTS
Siegfried Nitzsche and Manfred Wick, Burghausen, Germany, assignors to Wacker-Chemie G.m.b.H., Munich, Bavaria, Germany
No Drawing. Filed June 17, 1960, Ser. No. 36,713
Claims priority, application Germany July 10, 1959
5 Claims. (Cl. 32—15)

This invention relates to a method of employing silicone rubber in odontology for filling dental caries and root canals and taking dental impressions, and is a continuation-in-part of United States application Serial No. 816,716, filed May 29, 1959, which is in turn a continuation-in-part of United States application Serial No. 602,081, filed August 3, 1956.

Silicone rubber has been advanced as a satisfactory material for taking dental impressions as well as for filling root canals (see U.S. Patent application Serial Nos. 602,081, filed August 3, 1956, and 816,716, filed May 29, 1959). One difficulty heretofore encountered in the use of the silicone rubber masses was that it was necessary to combine certain ingredients just prior to use. Thus the dentist or technician had to thoroughly mix together carefully measured quantities of materials and thereafter use the mixture within a relatively short period of time before it set up and became too elastomeric for use.

It is an object of this invention to introduce a method of taking dental impressions as well as of filling dental root canals employing a single component silicone rubber system. A further object is to introduce a novel root canal packing which can readily be cleanly removed without drilling or other laborious technique. Other objects of the invention and advantages accruing therefrom are disclosed in or will be apparent from the disclosure and claims following.

This invention comprises utilization for dental moldings and root-canal filling of a mixture of (A) hydroxyl endblocked linear diorganopolysiloxane and (B) a minor proportion of an organotriacyloxy silane.

The materials employed include substantially linear diorganosiloxane polymers having —OH radicals as terminal units at the ends of the chains. Such polymers can be represented by the formula $HO(R_2SiO)_nH$ where each R is a monovalent hydrocarbon radical, a halogenated monovalent hydrocarbon radical or a cyanoalkyl radical and $n$ is an integer of at least 5. The substituent radicals represented by R can be alkyl radicals such as methyl, ethyl, propyl and octadecyl; alkenyl radicals such as vinyl, allyl and hexenyl; cycloaliphatic hydrocarbon radicals such as cyclohexyl, cyclopentyl, cyclohexenyl and cyclobutyl; alkaryl radicals such as benzyl and $\beta$-phenylethyl; aryl radicals such as phenyl, tolyl, naphthyl and xenyl; halogenated derivatives of the foregoing radicals such as chloromethyl, pentafluorobutyl, trifluorovinyl, chlorophenyl, bromophenyl, $\alpha,\alpha,\alpha$-trifluorotolyl, bromoxenyl, chlorotrifluorocyclobutyl, chlorocyclohexyl, iodophenyl, and 3,3,3-trifluoropropyl, as well as beta-cyanoethyl, gamma-cyanopropyl, omega-cyanobutyl, beta-cyanopropyl, gamma-cyanobutyl and omega-cyanooctadecyl. All of the organic substituents represented by R can be the same as in a dimethylsiloxane or they can be different as in phenylmethylsiloxane and ethylcyanoethylsiloxane. It is preferred that at least 75 percent of the substituents represented by R be lower alkyl radicals of less than 6 carbon atoms.

The linear diorganosiloxane polymers vary in physical characteristics from thin fluids of about 35 cs. viscosity at 25° C. to non-flowing, organic solvent soluble gums. In general, the liquid polymers are preferred because of ease of handling and assurance of flow to fill crevices and establish fine detail.

The operable linear diorganosiloxane polymers include mixtures of polymer types as well as copolymers. Minor proportions (i.e. less than .1 mol percent) of monoorganosiloxane units and/or triorganosiloxane units as well as methylhydrogensiloxane units can be tolerated but avoidance of such extraneous units is preferred.

The second ingredient employed herein is an organotriacyloxysilane represented by the formula $RSi(OAc)_3$ where R is as above defined and Ac is a saturated aliphatic monoacyl radical derived from a carboxylic acid such as propionyl, butyryl, hexoyl, 2-ethylhexoyl, octanoyl, isovaleryl and stearyl.

The linear diorganosiloxane A and organotriacyloxysilane B are mixed by any desired means. It is preferred to employ from .1 to 10% by weight of the silane B per 100 parts by weight of siloxane A. Longer working time or shorter cure can be achieved outside this range of silane to siloxane but the best results are achieved within the stated proportions. In addition to the siloxane A and the silane B minor proportions (i.e., less than 5 parts per 100 parts by weight diorganosiloxane polymer) of dyes, flavorings, sedatives, disinfectants, and devitalizing agents can be incorporated in the mixtures employed herein. It may also be desired to employ as cure accelerators .1 to 2% by weight based on the weight of siloxane A of ethanolamine, diethylaminoethanol, o-toluenesulphamide, oxalic acid, or other organic catalyst.

Furthermore, the mixtures employed in this invention can contain substantial proportions varying from 5 to 200 parts by weight of filler per 100 parts by weight of siloxane A. These fillers include reinforcing silicas such as fume silica, silica aerogel, and precipitated silicas. The reinforcing fillers can be treated and thus display organosilyl groups attached to the filler surface. Also operable are diatomaceous earth, crushed quartz, titania, ferric oxide, zinc oxide and the like. However, the filler employed should be substantially anhydrous and the filler should be preheated to drive off any adsorbed or absorbed water present in the filler.

The mixture of siloxane A, silane B, filler and other additives as employed can be stored in any container substantially excluding water or water vapor. The ingredients are inert to one another in the absence of moisture and will not harden or otherwise react while stored in the absence of moisture. The dentist or technician prepares the patient for application of fillings in caries, root-canal filling or for taking a dental impression. The mixture of siloxane A and silane B is then removed from its container which may be a tube, a jar or other container, and is applied employing normal techniques. The mixture begins to cure at once upon coming in contact with atmospheric moisture and particularly with the saliva in the oral cavity. The curing process is believed to involve hydrolysis of the organotriacyloxysilane to produce organosilanetriol $[RSi(OH)_3]$ and the carboxylic acid corresponding to the acyl substituent. The organosilanetriol acts as a crosslinking agent and the carboxylic acid acts as the curing catalyst ingredient required in the aforesaid parent applications Serial Nos. 816,716 and 602,081.

The following examples are included to illustrate the invention and not to restrict the scope of the invention. All parts and percentages in the examples are based on weight unless otherwise specified and all viscosities were measured at 25° C.

*Example 1*

A mixture was prepared by milling together 100 parts of hydroxyl endblocked dimethylsiloxane polymer of 20,000 cs. viscosity, 3.3 parts methyltriacetoxy silane and 50 parts diatomaceous earth. The mixture was filled into a tube. The mixture remained substantially unchanged after several weeks of storage. When a suitable quantity of the mixture was employed to fill a cleaned and otherwise prepared root-canal, a hard, thoroughly satisfactory filling was obtained after the mixture had been exposed to saliva for less than 30 minutes. The elastomeric filling could be cleanly and completely removed for further work merely by pulling it out of the root-canal with the aid of pincers.

*Example 2*

Equivalent materials were achieved when the dimethylsiloxane polymer in Example 1 was replaced with (a) a 5,000 cs. hydroxyl endblocked copolymer of 50 mol percent dimethylsiloxane units and 50 mol percent ethylphenylsiloxane units; (b) a mixture of 50% hydroxyl endblocked diethylsiloxane, 49% 3,3,3-trifluoropropylmethyl siloxane and 1% vinylmethylsiloxane having a viscosity of 150,000 cs. or (c) a 250,000 cs. copolymer of 75 mol percent methylethylsiloxane and 25 mol percent gamma-cyanopropylmethylsiloxane.

*Example 3*

Equivalent materials were achieved when the diatomaceous earth in Example 1 was replaced with fume silica and the methyltriacetoxysilane was replaced with methyltrioctanoyloxysilane; 3,3,3-trifluoropropyltriacetoxysilane; dodecyltriacetoxysilane; phenyltriacetoxysilane; vinyltriacetoxysilane; or methyltripropionyloxysilane.

That which is claimed is:

1. In a method employing silicone rubber in odontology the improvement consisting of (1) employing as the odontological material a mixture consisting essentially of (A) 100 parts by weight of an hydroxyl endblocked diorganosiloxane of the formula $HO(R_2SiO)_nH$ where each R is an organic substituent selected from the group consisting of monovalent hydrocarbon radicals, halogenated monovalent hydrocarbon radicals and cyanoalkyl radicals and $n$ is an integer of at least 5 and (B) 0.1 to 10 parts by weight of a silane of the formula $RSi(OAc)_3$ where R is as above defined and each Ac is a saturated aliphatic monoacyl radical derived from a carboxylic acid and (2) permitting the mixture to come into contact with water to secure curing to an elastomeric product.

2. The method of claim 1 wherein the mixture further contains (C) 5 to 200 parts by weight of silica filler.

3. The method of claim 2 wherein each R in the diorganosiloxane A and in the silane B is a methyl radical and (OAc) is an acetoxy radical.

4. The method of claim 3 wherein the mixture is employed as a dental root-canal filling and contains a total of up to 5 parts by weight of additives selected from disinfectants, sedatives and devitalizing agents.

5. The method of claim 3 wherein the mixture is employed to obtain a dental impression.

References Cited in the file of this patent

UNITED STATES PATENTS

| | | |
|---|---|---|
| 2,154,413 | Schlesinger | Apr. 11, 1939 |
| 2,843,555 | Berridge | July 15, 1958 |